(12) United States Patent
Belgarric et al.

(10) Patent No.: US 11,288,405 B2
(45) Date of Patent: Mar. 29, 2022

(54) INTEGRATED CIRCUIT(S) WITH ANTI-GLITCH CANARY CIRCUIT(S)

(71) Applicant: Hewlett-Packard Development Company, L.P., Spring, TX (US)

(72) Inventors: Pierre Belgarric, Bristol (GB); David Plaquin, Bristol (GB); Eugene Cohen, Boise, ID (US); Chris R. Gunning, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/058,152

(22) PCT Filed: Oct. 25, 2018

(86) PCT No.: PCT/US2018/057565
§ 371 (c)(1),
(2) Date: Nov. 24, 2020

(87) PCT Pub. No.: WO2020/086087
PCT Pub. Date: Apr. 30, 2020

(65) Prior Publication Data
US 2021/0312092 A1    Oct. 7, 2021

(51) Int. Cl.
*G06F 21/76* (2013.01)
*G06F 21/60* (2013.01)
(Continued)

(52) U.S. Cl.
CPC .......... *G06F 21/76* (2013.01); *G06F 1/3296* (2013.01); *G06F 21/60* (2013.01); *G06K 19/073* (2013.01)

(58) Field of Classification Search
CPC ........ G06F 21/76; G06F 21/60; G06F 1/3296; G06K 19/073
See application file for complete search history.

(56) References Cited

U.S. PATENT DOCUMENTS 7,085,979 B2    8/2006    Kim et al.
8,555,124 B2    10/2013   Idgunji et al.
(Continued)

FOREIGN PATENT DOCUMENTS

CN    2718783    8/2005

OTHER PUBLICATIONS

Bonny, T., Nasir, Q. Clock glitch fault injection attack on an FPGA-based non-autonomous chaotic oscillator. Nonlinear Dyn 96, 2087-2101 (2019). https://doi.org/10.1007/s11071-019-04907-9 (Year: 2018).*

(Continued)

*Primary Examiner* — Saleh Najjar
*Assistant Examiner* — Devin E Almeida
(74) *Attorney, Agent, or Firm* — HP Inc. Patent Department

(57) ABSTRACT

An IC comprising functional circuit to perform primary functions of the IC is provided. The functional circuit is to enable electrical signals to propagate through it within a timing constraint of the functional circuit. The IC comprises at least one canary circuit used for detecting glitch attacks on the circuit. Electrical signals are to propagate through the canary circuit(s) within a defined timing constraint of the canary circuit(s). The canary circuit is to provide a signal path designed such that in the event of a timing constraint of the functional circuit(s) is violated due to a glitch attack, also the timing constraint of the canary circuit(s) is violated.

15 Claims, 15 Drawing Sheets

(51) Int. Cl.
G06F 1/3296 (2019.01)
G06K 19/073 (2006.01)

(56) References Cited

U.S. PATENT DOCUMENTS

| | | |
|---|---|---|
| 8,615,687 B2 | 12/2013 | Sandhu et al. |
| 8,860,502 B2 | 10/2014 | Gemmeke et al. |
| 9,257,199 B2 | 2/2016 | Schreiber |
| 9,459,314 B1 | 10/2016 | Chang |
| 9,564,883 B1 | 2/2017 | Quinton et al. |
| 9,746,877 B2 | 8/2017 | Zhou et al. |
| 9,823,301 B2 | 11/2017 | Panades |
| 2002/0166058 A1* | 11/2002 | Fueki .................. G06Q 20/341 713/194 |
| 2003/0226082 A1* | 12/2003 | Kim .................... G06K 19/073 714/734 |
| 2006/0052962 A1* | 3/2006 | Shipton ................ H04N 1/405 702/106 |
| 2008/0086781 A1* | 4/2008 | Rodgers ............... G06F 21/552 726/34 |
| 2014/0025960 A1* | 1/2014 | McLean ................ G06F 21/60 713/189 |
| 2014/0201607 A1* | 7/2014 | Ashkenazi ............ G06F 11/08 714/819 |

OTHER PUBLICATIONS

J. Obermaier, R. Specht and G. Sigl, "Fuzzy-glitch: A practical ring oscillator based clock glitch attack," 2017 International Conference on Applied Electronics (AE), 2017, pp. 1-6, doi: 10.23919/AE.2017.8053601. (Year: 2017).*

* cited by examiner

INTEGRATED CIRCUIT(S) WITH ANTI-GLITCH CANARY CIRCUIT(S)

BACKGROUND

An integrated circuit is a circuit in which all or some of the circuit elements are inseparably associated and electrically interconnected so that it is considered to be indivisible for the purposes of construction and commerce. The integrated circuit comprises functional circuit(s), which perform primary functions of the integrated circuit. Such primary functions are, for example, to store data and to provide access to that data.

BRIEF DESCRIPTION OF THE DRAWINGS

Features and advantages of examples will be described, by way of example only, in the following detailed description with reference to the accompanying drawings in which like reference numerals correspond to similar, though perhaps not identical, components. For the sake of brevity, reference numerals or features having a previously described function may or may not be described in connection with other drawings in which they appear.

Figure 1:
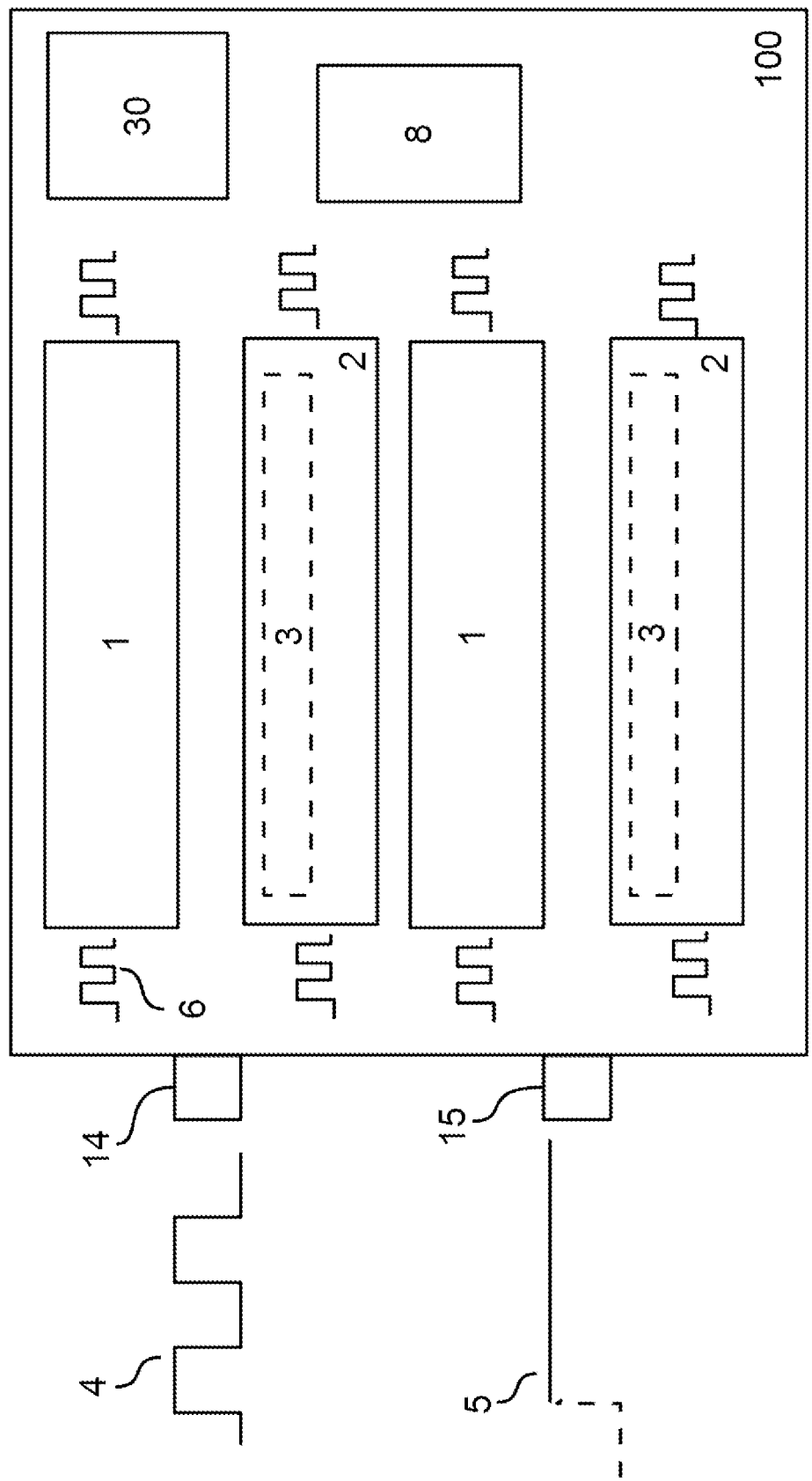
FIG. 1 shows a schematic block diagram of an integrated circuit equipped with functional circuits and canary circuits under normal operation.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Examples provided herein include an integrated circuit and a method of handling a glitch attack on an integrated circuit. Integrated circuits are increasingly subject to hardware associated attacks based on tampering with input signals of the circuit. This enables an attacker to read out sensitive data, to circumvent authenticity checks etc. An often-used hardware associated attack is a so-called glitch attack which is based on disrupting a power/voltage or clock input of an integrated circuit, such that timing constraints of an integrated circuit are violated and security related functions of the chip might therefore fail.

The primary function of an integrated circuit, mentioned in the background section is, in some examples, the main purpose of the integrated circuit. As such, for example, when the main purpose of the integrated circuit is to store data and to provide access to that data, the functional circuits are, for example, reading/writing circuits for a data storage. The functional circuit may also correspond to the integrated circuit main logic. The integrated circuit has a power/voltage input and a clock input.

The at least one functional circuit enables signals to propagate through the at least one functional circuit in accordance with a timing constraint of the at least one functional circuit. Signal propagation through a circuit is understood herein as the signal entering an input of the circuit, passing through the circuit's interior logic and leaving the circuit at its output. The timing constraint of the functional circuit is, for example, a timing constraint of the hardware logic gates (especially CMOS gates). To work properly, the clock period of a clock signal for the integrated circuit is high enough for registers in the circuits to stabilize to the correct value.

The timing constraint of the at least one functional circuit, for example, ensures that electrical signals propagate fast enough through the circuit such that register-values of the at least one functional circuit stabilize before a clock signal edge and at each clock signal edge, the register value of the functional circuit is the correct one.

In addition to the at least one functional circuit, the integrated circuit also comprises at least one canary circuit. The at least one canary circuit is to be used in the detection of glitch attacks. In some examples, the at least one canary circuit serves as a detector for said glitch attacks.

A glitch attack is based on perturbing the inputs (power/voltage, clock, etc.) of an integrated circuit with a glitch (disrupting the signal with a short spike). This may interfere with the logic of the integrated circuit. It can lead to the attacker successfully tampering with the integrity of the system or its data, or to get access to secret or sensitive data, for example by Bypassing security mechanism such as secure boot and execute their own software (and then access any credentials stored within the chip)

Force leakage of information and perform cryptanalysis to deduce the value of some secret data (e.g. keys).

The at least one canary circuit also enables electrical signals to propagate through the at least one canary circuit according to at least one defined timing constraint of the canary circuit. The defined timing constraint of the canary circuit ensures also here, for example, that electrical signals propagate fast enough through the circuit such that register values of the canary circuit stabilize before a clock signal edge and at each clock signal edge, the register value of the canary circuit is the correct one.

As the at least one canary circuit and the at least one functional circuit, for example, face the same clock signal and the same power/voltage input the timing constraint of the canary circuit and the timing constraint of the at least one functional circuit is, for example, the same design constraint, namely that signal propagate fast enough through the circuit that register values in the circuit are settled and correct at each clock signal edge.

The at least one canary circuit is to provide at least one signal path designed such that in the event of a timing constraint of the at least one functional circuit is violated due to a glitch attack, also the timing constraint of the at least one canary circuit is violated. The signal path of the at least one canary circuit is, for example, a digital logic path through which signals propagate just within the timing constraint of the at least one canary circuit.

As such, the canary circuits may exhibit the longest propagation paths in the integrated circuit. At least, in some examples, the propagation time of a signal through the canary circuit is equal to or longer than the signal propagation time of a time critical functional circuit (which is a circuit through which signals propagate just within the timing constraint of the functional circuit).

Glitch attacks on the clock input (e.g. inserting a short spike on the clock) cause a timing constraint violation of the at least one functional circuit as well as the at least one canary circuit. This is the case as due to disrupting the clock signal, the clock signal edge might arrive earlier—such that register values of the at least one canary circuit and of the at least one functional circuit do not have settled upon arrival of said clock signal edge.

Glitch attacks on the power/voltage input may cause signal propagation speed to be decreased, which in turn, also leads to a violation of the timing constraint both of the at least one canary circuit and the at least one functional circuit.

The at least one violation of the timing constraint of the at least one canary circuit is counted as a detection of a glitch attack.

In some examples, the at least one canary circuit is to send at least one intrusion-detection signal to a monitoring logic in response to the timing constraint of the at least one canary circuit being violated. The monitoring logic can be a part of the same integrated circuit as the at least one canary circuit and the at least one functional circuit.

The monitoring logic is, for example, to cause at least one counteraction against a glitch attack in response to receiving said at least one intrusion detection signal.

In some examples, a plurality of canary circuits are distributed over the integrated circuit.

In some examples, the at least one canary circuit is implemented in a block of the integrated circuit which is separate to the at least one functional circuit. The canary circuits are, for example, discrete circuit elements and are, for example, disjoint from the at least one functional circuit.

To ensure that, for example, local variations within an integrated circuit, such as manufacturing differences of CMOS switches or local EM field effects are not the cause of a timing constraint violation of a canary circuit but indeed an attack also afflicting the at least one functional circuit, there is, for example, a sufficient difference between the signal propagation paths of the functional circuits and the signal propagation paths of the canary circuits in terms of time criticality. Time criticality refers herein to the difference of a propagation time through a circuit in relation to the clock signal period—circuits with a high propagation time that finish signal processing only a short time before a clock signal edge are more time critical than such that finish signal processing well before the clock edge.

By distributing a plurality of canary circuits over the integrated circuit, it is also easier to avoid invasive glitch attacks as spots for an invasive glitch attack to be successful are limited.

In some examples, the integrated circuit comprises a plurality of canary circuits and at least a part of the canary circuits is to provide a signal path designed such that when the timing constraint of the at least one canary circuit is violated, the timing constraint of the at least one functional circuit is not yet violated.

Nonetheless, the signal path of such canary circuit provides a signal path with a signal propagation time as such that in the event of a glitch attack tampering with the timing constraint the at least one functional circuit—performing the primary functions—also the timing constraint of the canary circuit is violated.

Hence, a violation of timing constraint of the functional circuit means a violation of the defined timing constraint of these canary circuits but a timing constraint violation of those canary circuits does not necessarily indicate that the at least one functional circuit is compromised.

In some examples, the integrated circuit comprises at least one strict canary circuit, wherein the strict canary circuit provides a signal path such that when the timing constraint of the strict canary circuit is violated, the timing constraint of the at least one functional circuit is not violated and there is at least one relaxed canary circuit that provides a signal path with a signal propagation time closer to a signal propagation time of the at least one functional circuit than a signal propagation time of the strict canary circuit.

The signal propagation time through a relaxed canary circuit is typically shorter than those through a strict canary circuit—for which a timing constraint violation occurs more easily.

In some examples, when only the timing constraint of the at least one strict canary circuit is violated, wherein the monitoring logic is to cause counteractions by informing an integrated circuit main logic and the integrated circuit main logic is to perform the at least one counteraction against the glitch attack. This is the case as timing constraint violation of at least one strict canary circuit only indicates that the functional circuit(s) (that could also correspond to the main logic of the integrated circuit) is/are not compromised.

In some examples, when the timing constraint both of the at least one strict canary circuit and the at least one relaxed canary circuit is violated, the monitoring logic is to perform the at least one counteraction against the glitch attack. Timing constraint violations of both sorts of canary circuits (strict and relaxed) indicate that the functional circuits and therewith the main logic of the integrated circuit is very likely compromised so that counteractions are to be performed by the monitoring logic itself instead of by the functional circuit.

In some examples, where the at least one canary circuit comprises standard logic gates is to perform calculation operations. In some examples, when a result of the calculation operations performed does not match an expected result of the calculation operation, a violation of a timing constraint of the at least one canary circuit is deemed to have occurred.

Standard logic gates are gates corresponding to logical operations such as "AND", "OR", "NOT", "XOR", NAND" and so forth.

By connecting such logic gates with each other, calculation tasks that require a signal propagation time through the canary circuit as needed can be created. To provide an example, a calculation task is chosen that yields a processing time such that the result is available just before the clock-signal edge so that under normal conditions the timing constraint of the canary circuit is not violated, but said timing constrain is violated in the event of a glitch attack on the integrated circuit.

In some examples, the standard logic gates in the signal path of the canary circuit comprise a succession of inverters. Inverters are logical gates performing a "NOT" or negation operation. This succession of inverters is, for example, connected to a plurality of other logical gates to form said signal path. The usage of standard logic gates in the signal path makes it possible to embed the canary circuit at the integrated circuit's core logic.

In some examples, the at least one canary circuit is to provide a signal path as such that the timing constraint is violated as a consequence of at least one glitch present in a voltage signal for the integrated circuit. The glitch present in a voltage signal for the integrated circuit corresponds to a glitch present in the power signal for the integrated circuit.

In these examples, the signal path is to provide a propagation time through the at least one canary circuit that allows register bits to settle within the canary circuit with such a distance in time (further referred to herein also as "time buffer") to the clock-signal edge, such that the timing constraint of the canary circuit is not violated by natural voltage, temperature or manufacturing differences on the integrated circuit but is certainly violated as a consequence of glitch in the clock-signal, e.g. a clock edge shift to an earlier time. Canary circuits with such a signal path are also referred to herein as "anti clock-glitch canary circuits".

In other examples, the at least one canary circuit is to provide a signal path as such that the timing constraint is violated as a consequence of at least one glitch present in a voltage signal for the integrated circuit. As mentioned above, a glitch in the voltage signal corresponds to a glitch in the power signal.

For these examples, the signal path of the at least one canary circuit is chosen such as explained above for the anti-clock glitch canary circuit but with the difference that the signal path of the circuit yields a time buffer so that said timing constraint is violated by a glitch present in the power/voltage input but not said rather natural local fluctuations. Canary circuits with such a signal path are also referred to herein as "anti voltage-glitch canary circuits".

The above-mentioned time buffer is designed differently for anti clock-glitch canary circuits than for anti voltage-glitch canary circuits. This is the case as slowing down signal speed, as it is the case for a glitch attack on the integrated circuit's voltage input, may cause violations of a (canary) circuits timing constraint on a significantly higher or lower timescale than violations caused by a glitch introduced into the clock signal for the integrated circuit. An anti clock-glitch canary circuit, for example, with a signal path to detect (high) timing constraint violations, providing therefore a comparable short signal path, would not be able to detect (smaller) timing constraint violations caused by a glitch introduced into the circuit's input voltage.

In some examples the integrated circuit therefore comprises at least one anti clock-glitch canary circuit and at least one anti-voltage glitch canary circuit to reliably detect glitch attacks on the integrated circuit's power/voltage input and glitch attacks on the integrated circuit's clock input.

In some examples, the integrated circuit comprises a cryptographic engine and wherein the at least one canary circuit is placed in the integrated circuit adjacent to at least one of the input and the output of said cryptographic engine. The cryptographic engine is an example for a functional circuit which is monitored by the at least one canary circuit for glitch attack detection.

By placing the canary circuits this way, they face the same local variations as the ports of the cryptographic engine, which makes the detection accurate for this engine and diminishes the risk of a successful invasive glitch attack. An invasive glitch attacker would most likely also affect the canary circuit by its attack not only the cryptographic engine as the at least one canary circuit is placed close to the cryptographic engine. The cryptographic engine is a sensitive place as tampering with said cryptographic engine may result in deducing the value of an encryption key.

In some examples, the integrated circuit comprises a storage medium on which a firmware-signature is stored and wherein the at least one canary circuit is placed adjacent to circuits for accessing said storage medium on which the firmware signature is stored.

The firmware signature's storage place is sensitive as the firmware signature could be retrieved by unauthorized persons due to a successful glitch attack. This could, for example, enable those persons to provide a non-authentic firmware with said signature.

In this example, the canary circuit also "sees" the same local variations as the firmware-signature storage when placed like that and invasive glitch attacks are unlikely to succeed are attackers would most likely also tamper with the adjacent placed canary circuit not only with the firmware storage.

In some embodiments, the monitoring logic is a chip monitoring logic and wherein the counteractions against the glitch attack performed by this monitoring logic comprises notifying a main logic of the integrated circuit.

The monitoring logic is to notify the integrated circuits main logic upon receiving the intrusion detection signal send by the at least one canary circuit.

The integrated circuit's main logic is to block access to the integrated circuit or disable parts of the integrated circuit upon being notified.

Those blocking or disabling actions could be at least one of (i) blocking access to at least one memory of the integrated circuit and (ii) disconnecting a network connection of a host device of the integrated circuit.

By blocking to a memory of the integrated circuit, sensitive data cannot be read out from said memory or sensitive data cannot be overwritten by an attacker. The memory of the integrated circuit could be one of the above mentioned functional circuits. By disconnecting a network connection of a host device of the integrated circuit, it is ensured that after a security breach caused by a glitch attack no other device of the network is affected.

Furthermore, access to the hard drive controller, to the PCI controller or any other subsystem may be blocked.

In some examples, the integrated circuit comprises at least one microchip and the counteractions against the glitch attack are chip-wide actions. Those chip-wide actions comprise at least one of the following: (i) reset, (ii) hold, (iii) data wipe.

Those chip-wide actions are either performed by the monitoring unit itself or by another entity of the integrated circuit.

In the course of the counteraction "reset" the chip is set to a default state. In the course of the counteraction "hold"—further processing of chip operations is stopped. In the course of the counteraction "data wipe", all data is erased from the chip.

The examples described herein also relate to a method of handling a glitch attack on an integrated circuit. The method comprises:

Performing primary functions of the integrated circuit by at least one functional circuit, wherein the at least one functional circuit enables electric signals to propagate through the at least one functional circuit in accordance with a timing constraint of the at least one functional circuit, detecting a glitch attack, wherein detecting the glitch attack comprises:

checking whether or not a defined timing constraint of at least one canary circuit is violated, the at least one canary circuit being a circuit comprised by the integrated circuit, wherein the at least one canary circuit enables electrical signals to propagate through the at least one canary circuit in accordance with the defined timing constraint, wherein the at least one canary circuit provides a signal path designed such that in the event of a timing constraint of the at least one functional circuit is violated due to a glitch attack, also the defined timing constraint of the at least one canary circuit is violated, reacting to a detected glitch attack, wherein reacting to the detected glitch attack comprises:

sending at least one intrusion-detection signal to a monitoring logic in response to the timing constraint of the at least one canary circuit being violated, causing—by the monitoring logic—at least one counteraction against a glitch attack in response to receiving said at least one intrusion-detection signal.

The method of handling a glitch attack and reacting to a glitch attack comprises any of the functions described in conjunction with examples pertaining to the integrated circuit disclosed herein.

Referring to FIG. 1, the exemplary integrated circuit 100 comprises two functional circuits 1 and two canary circuits 2. The functional circuits 1 are to perform primary functions of the integrated circuit, such as a cryptographic operation using a private key, storing information etc. The canary circuits 2 are used in detecting glitch attacks 200 (see FIGS. 2, 5, 6 and 7) on the integrated circuit 100. The integrated circuit 100, for example, comprises at least one micro-chip. The exemplary canary circuits 2 are located on each of those chips or only on such chips that perform critical operations for data security, such as encryption etc.

The exemplary integrated circuit 100 is supplied with a clock signal 4 at a clock input 14 with a supply voltage/power at a power/voltage input 15.

Electrical signals 6 are to propagate through the functional circuits 1 in accordance with a timing constraint of the functional circuit 1.

The canary circuits 2 provide a signal path 3 for electrical signals 6 to propagate within the timing constraints of the canary circuit 2. The signal path 3 is designed such that in the event of a glitch attack (which is further described in conjunction with FIG. 2 below)—in response to the timing constraint of the functional circuit 1 is violated, also the timing constraint of the canary circuits 2 is violated.

This is the case, as propagating through a signal path 3 of the canary circuits 2 needs more time or the same time than propagating through, for example, the functional circuit 1 with the longest signal path, which is, a time critical circuit. The signal path of the canary circuits 2 is chosen—by design of signal path 3—that signals propagate just within the timing constraints of the canary circuits 2.

Any glitch attack which violates the timing constraints of a function circuit 1, e.g. the above-mentioned time critical circuit, consequently also violates the timing constraints of at least one of the canary circuits 2.

A violation of a timing constraint of at least one canary circuit 2 corresponds to the detection of a glitch attack by the canary circuit(s) 2. The integrated circuit 1 further comprises a monitoring logic 8 to cause counteractions 80 (see FIGS. 11 and 12) against the glitch attack and a main logic of the integrated circuit 30.

It is noted here that the functional circuit 1 and the main logic of the integrated circuit 30 might be the same or separate circuits.

Figure 2:
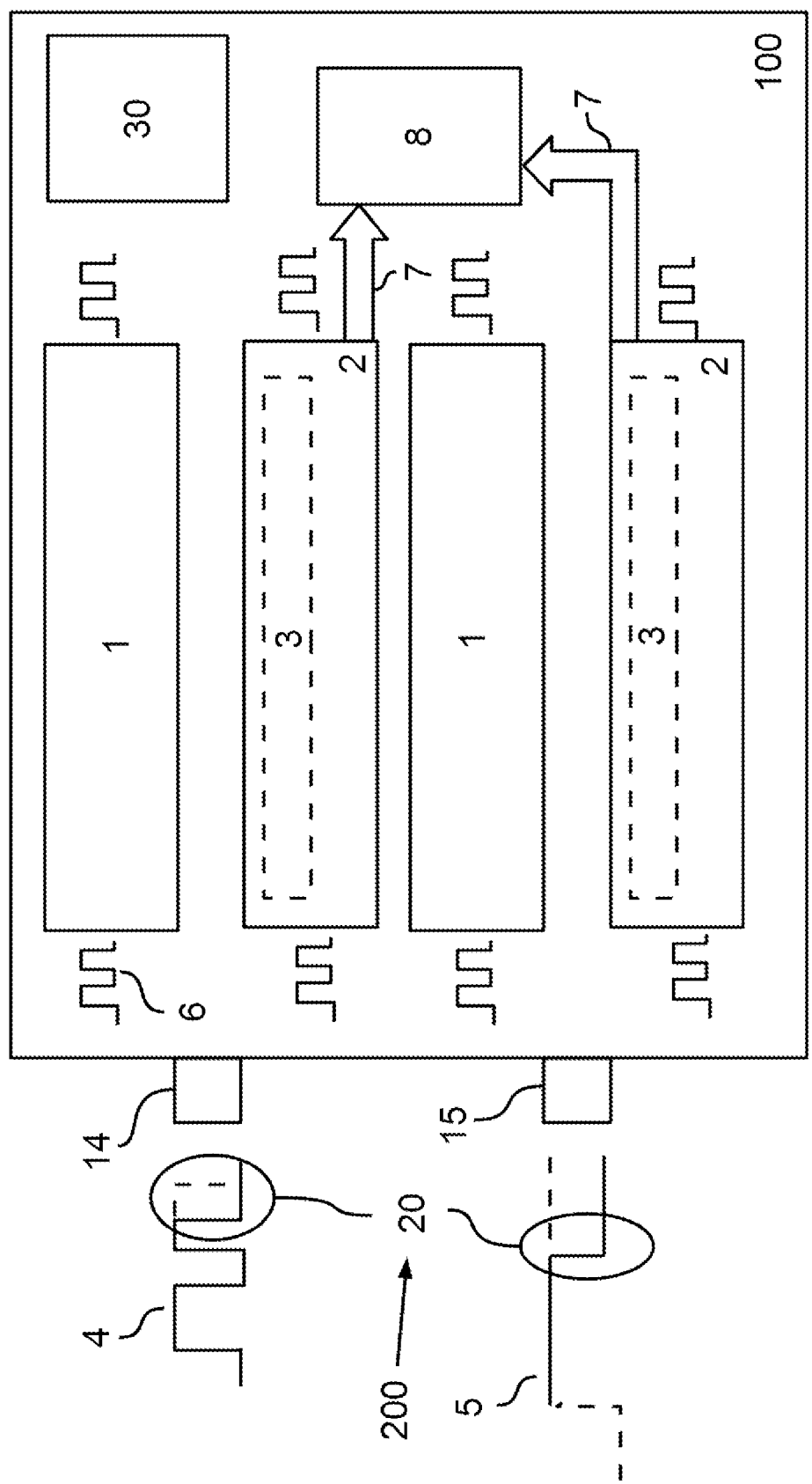
FIG. 2 shows a schematic block diagram on the integrated circuit of FIG. 1 when the integrated circuit suffers a glitch attack.

FIG. 2 shows an exemplary glitch attack 200. The glitch attack 200 can be, for example, directed to at least one of (i) the voltage signal 5 and (ii) the clock signal 4. When the glitch attack 200 is directed to the clock signal 4, for example, a glitch 20 is introduced into the clock signal by introducing a spike into the clock pulse, with the consequence that a clock edge is timed earlier than intended. The timing constraints of at least one of the functional circuits 1 is thereby violated. Hence, for example, if an authentication procedure is interrupted that way, access might be granted to the attacker although authentication was never successful.

Similarly, the glitch 20 introduced into the voltage signal slows down signal propagation speed through the functional circuits 1. Due to the slow signal propagation speed also here security related processes, performed by functional circuits 1 can be sabotaged.

To prevent the glitch attack 200 from succeeding, the integrated circuit 1 is provided with the above described canary circuits 2. As a consequence of the glitch attack 200, not only the timing constraints of the functional circuits 1 are violated, but at the same time also the timing constraints of the canary circuits 2 are violated. The canary circuits 2 are to react to this violated by sending at least one intrusion detection signal 7 to the monitoring circuit 8. The monitoring circuit 8 is to cause at least one counteraction against the glitch attack 200. The at least one counteraction comprises for example notifying the integrated circuit main logic 30, which then, e.g. blocks access to a memory or disconnects the network connection of the integrated circuit (or the host device of the integrated circuit) or initiating chip-wide actions such as hold, reset or data wipe.

Figure 11:
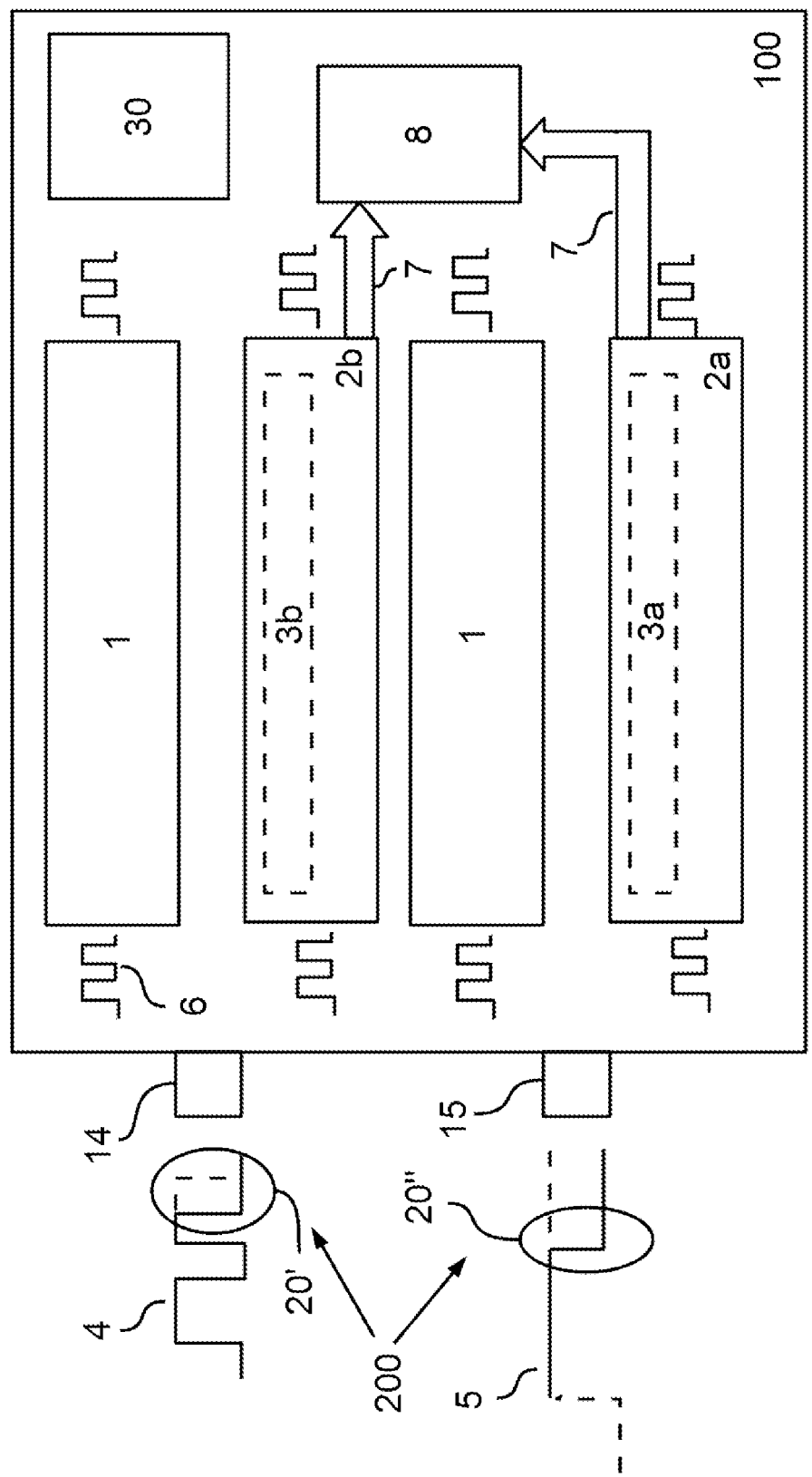
FIG. 11 shows a schematic block diagram of an integrated circuit equipped with strict and a relaxed canary circuits, with the strict and the relaxed canary circuit responding to a glitch attack
Figure 12:
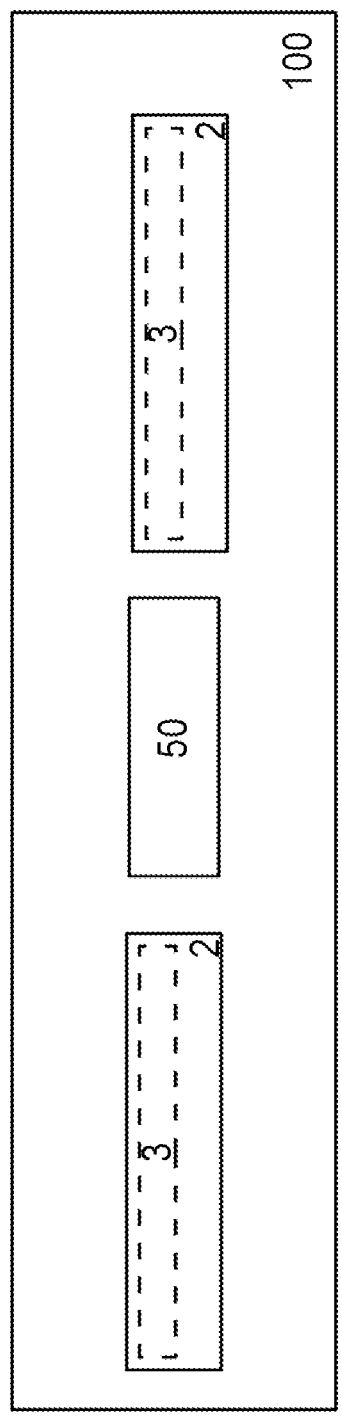
FIG. 12 shows an exemplary integrated circuit with a canary circuit placed adjacent to input and output of a cryptographic engine circuit.

Hence, although the timing constraints of at least one functional circuit is violated, an attacker cannot seize the merits of the glitch attack 200 as this is prevented by the at least one counteraction 80 (see FIGS. 11 and 12).

Figure 3:
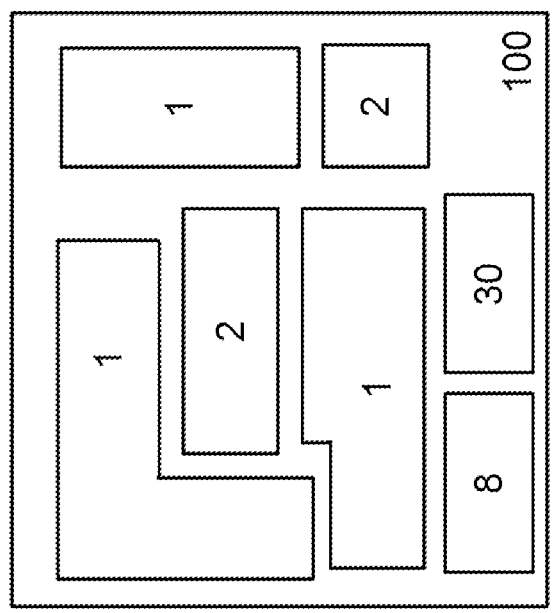
FIG. 3 shows a schematic block diagram on an exemplary distribution of canary circuits and functional circuits over an exemplary integrated circuit.

FIG. 3 shows a schematic block diagram of an exemplary distribution of functional circuits 1 and canary circuits 2 an exemplary integrated circuit 100. The integrated circuit 100 can, for example, be equipped the same further elements (monitoring logic 8, integrated circuit main logic 30) as the integrated circuit illustrated by FIG. 1 or 2.

The two canary circuits 2 of the integrated circuit 100 are distributed over the integrated circuit 100 as illustrated by FIG. 3. The canary circuits 2 are implemented in blocks of the integrated circuit 100 that are separate to the three functional circuits 1. Hence, the canary circuits 2 are discrete and not necessarily connected to the functional circuits 1. As the canary circuits 2 are designed as blocks separate to the functional circuits 1 they do not have to be included into design considerations for the functional circuits 1.

Figure 4:
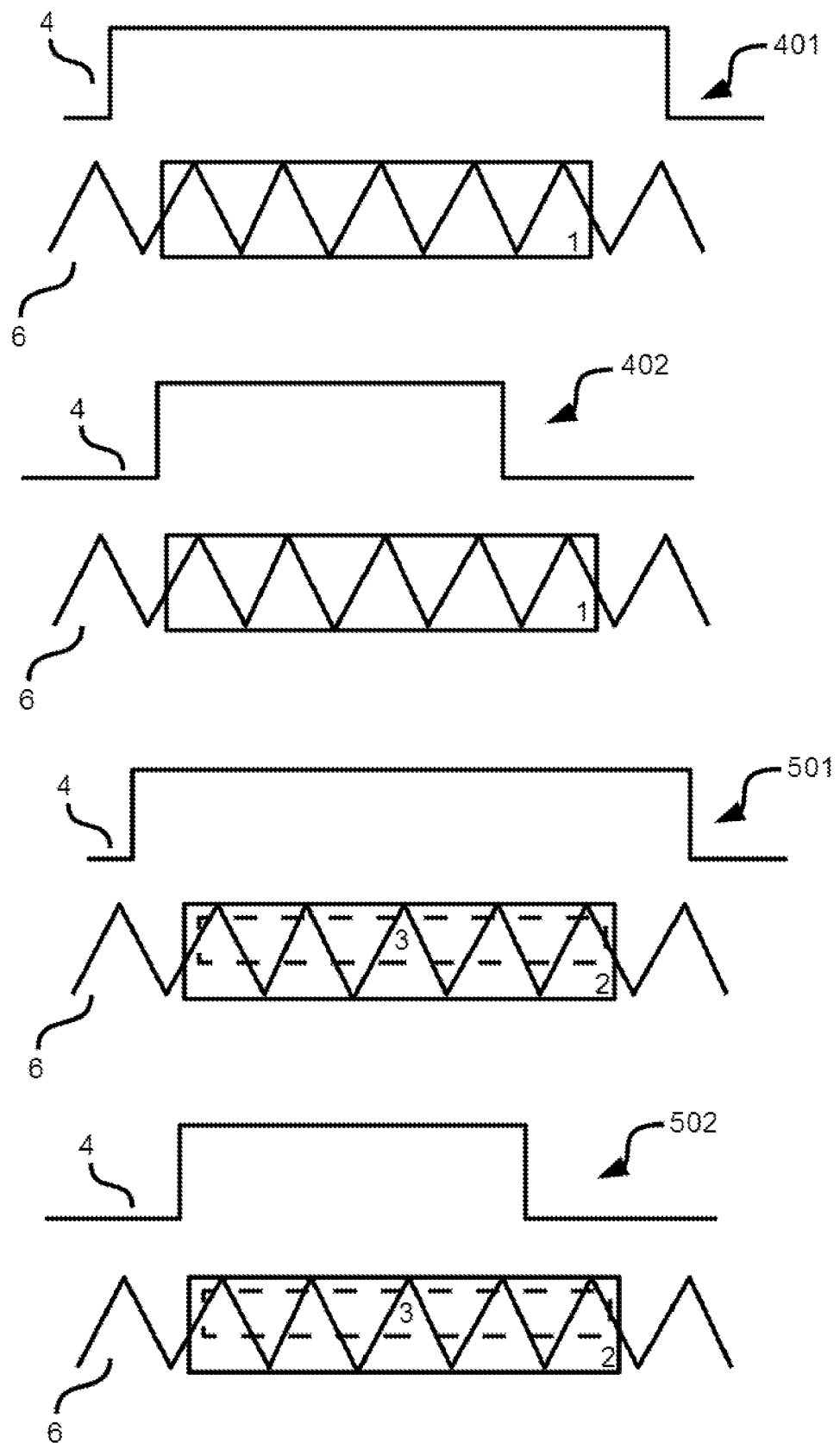
FIG. 4 shows schematic examples of time constraint violations and non-violations of canary circuits and functional circuits.

FIG. 4 shows a schematic block diagram of situation in which the timing constraint of a functional circuit 1 is violated 402 and a situation in which said timing constraint is not violated 401 and a situation in which the timing constraint of a canary circuit is violated 502 and a situation in which the timing constraint of a canary circuit is not violated 502. When a violation of the timing constraint of the functional circuit 402 occurs, the clock signal 4 edge arrives before the electrical signal 6 (the circuit's input signals) have propagated to the functional circuits output and hence have been processed completely and register values of said circuit have settled to the correct value. When the clock signal edge 4, however, arrives before the electrical signal 6 is processed (and said register values have settled) the timing constraint of the functional circuit is violated 402.

Violations and non-violations of constraints of the canary circuit 502, 501 also correspond to the signal 6 propagating fast enough through the signal path 3 such as register values are settled before the clock signal edge arrives (situation 501) or too slow such that the register values are not settled upon arrival of the clock-signal edge (situation 502).

Figure 5:
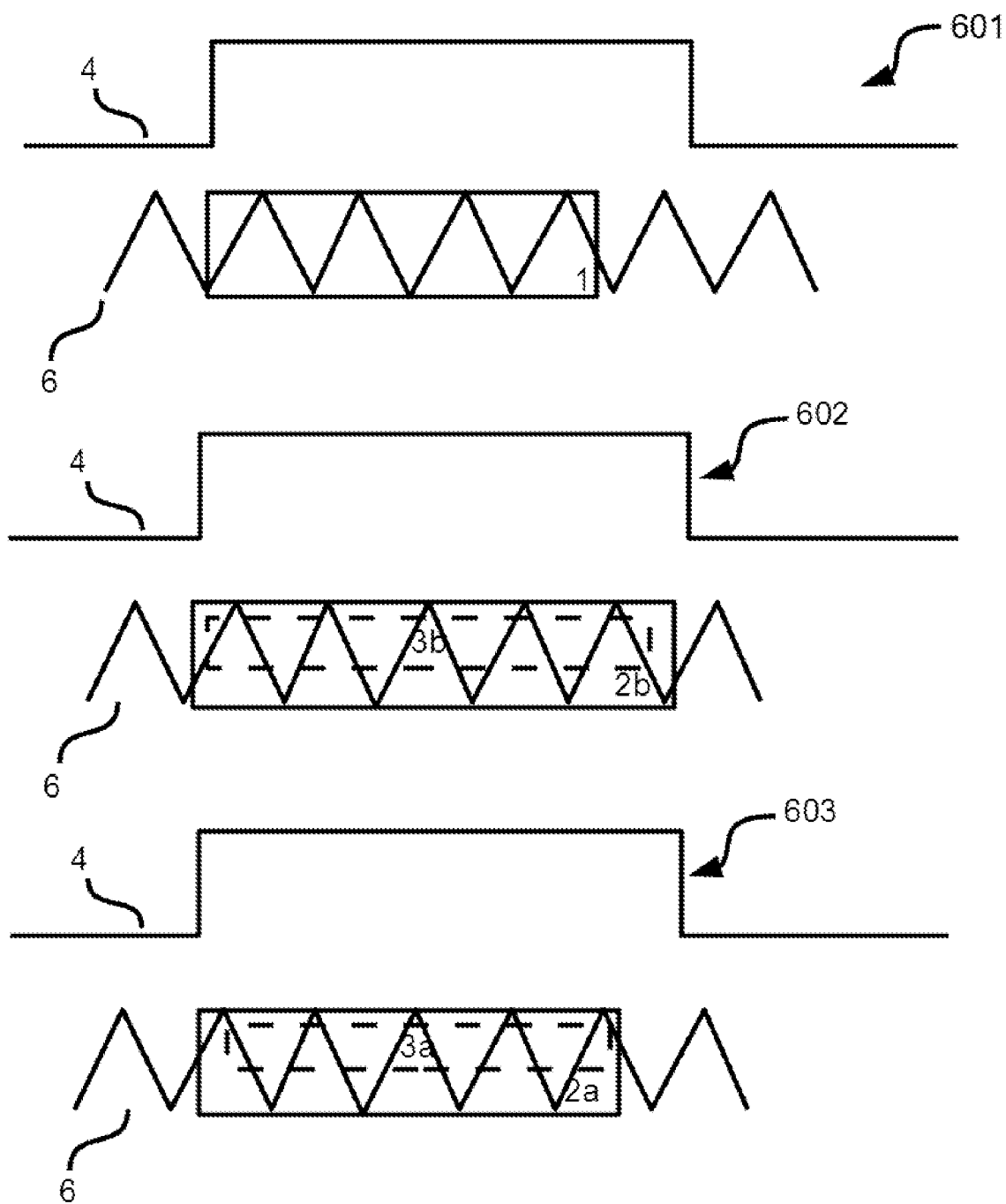
FIG. 5 shows schematic examples of a functional circuit and of a strict and a restrictive canary circuits with their respective signal propagation time relative to a clock pulse width.

FIG. 5 is schematic examples of a functional circuit and of a strict and a restrictive canary circuits with their respective signal propagation time relative to a clock pulse width.

Functional circuit 1 shows no timing constraint violation in situation 601, as signals can propagate through the functional circuit 1 before the edge of clock signal 4 arrives. The signal propagation time is indicated by the length of the boxes representing the functional circuit 1 and the relaxed and strict canary circuits 2a, 2b respectively, the clock pulse width by the shape of clock pulse 4.

The functional circuit 1 is, for example, guarded by a strict canary circuit 2b and a relaxed canary circuit 2a, having signal paths 3a, 3b respectively. In the case a glitch attack on the voltage occurs, the voltage pulse 4 is shortened, as explained above. The strict canary circuit 2b is very sensitive with regard to such a pulse-shortening as the signal propagates through the circuit right before the arrival of the clock signal edge 4, as shown in situation 602. However, there is more buffer for a signal to propagate through the functional circuit 1 before the clock signal 4 arrives (see situation 601). Hence, the timing constraint of the strict canary circuit 2b might be violated with the timing constraint of the functional circuit 1 not being violated. However, if the timing constraint of the functional circuit is violated, then also the timing constraint of the strict canary circuit 2b is violated.

However, the signal propagation path 3a of the relaxed canary circuit 2a is shorter than the signal propagation path 3b of said strict canary circuit 2b. Therefore, timing constraints are more relaxed for the relaxed canary circuit 2a. The length of signal propagation path of relaxed canary circuit 2a is closer to the length of signal propagation path of the functional circuit 1 the corresponding signal path length of the strict canary circuit 2b. This means but also that if the timing constraint of the relaxed canary circuit 2a is violated, the timing constraint of the functional circuit 1 is very likely also violated, as in this example, relaxed canary circuit 2a and functional circuit 1 nearly face the same timing constraint (see comparison of situation 601 and 603).

Figure 6:
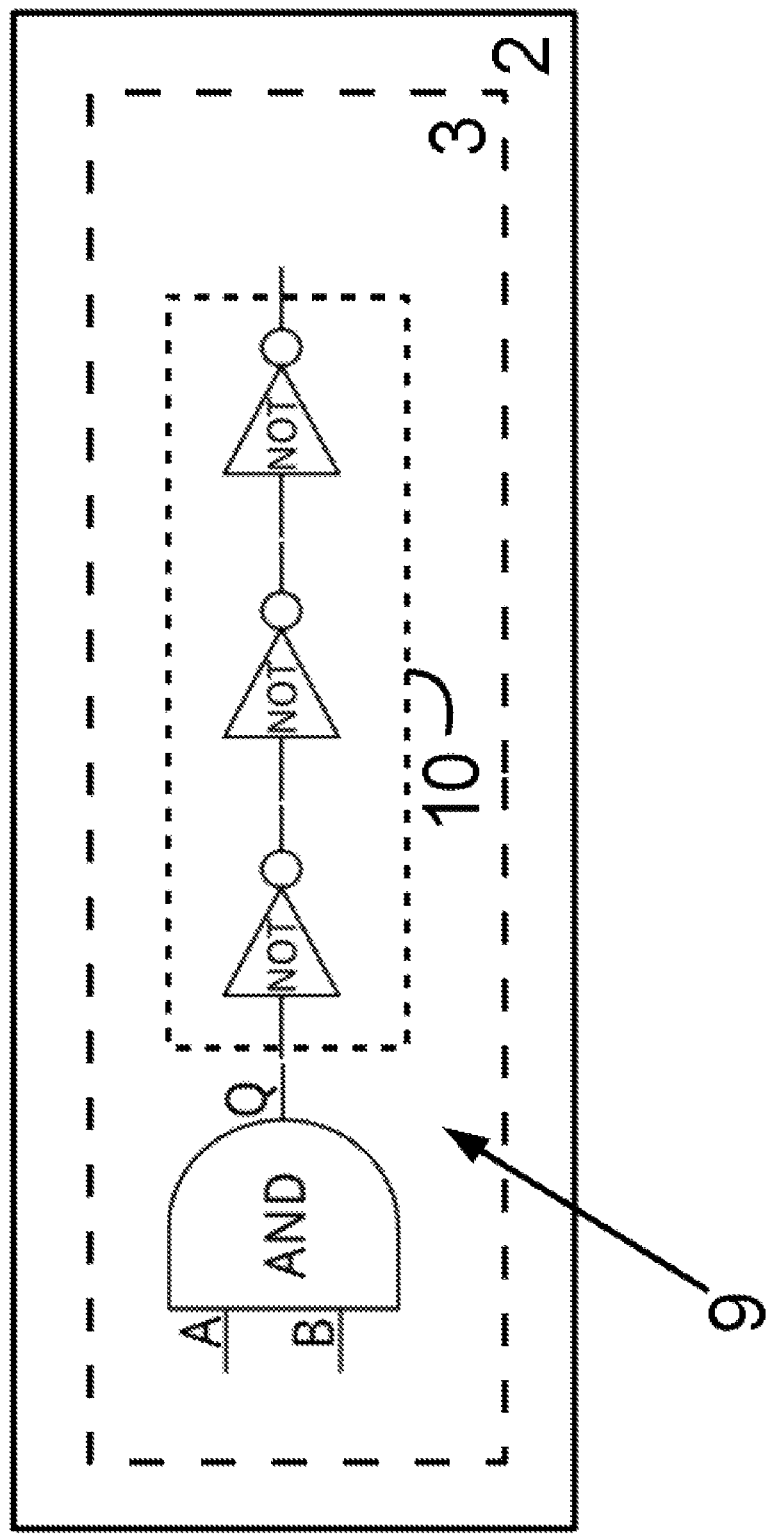
FIG. 6 shows a schematic block diagram of a canary circuit with a signal path including a series connection of standard logic gates.

FIG. 6 is a schematic block diagram of a single canary circuit 2. The canary circuit 2 has an exemplary signal path 3. In the example illustrated by FIG. 4, the signal path is constituted by standard logic circuits 9. The standard logic circuits 9 are chosen as such that the path 3 provides a propagation time for a signal that is close to violating the timing constraint of the canary circuit 9. This propagation time can be bigger or equal to the propagation time of a rather time critical functional circuit 1 of integrated circuit 100. Still, the propagation time is chosen with a time buffer to the timing constraint of the canary circuit as such that the above-mentioned impacts of local variations between the functional circuits 1 to be monitored and the canary circuits 2 on signal propagation time do not cause false positive glitch attack 200 (see FIGS. 2, 5-7) detections.

In the example illustrated by FIG. 5, standard logic gates 6 in the form of a chain of an "AND" gate and a succession of three inverters (which are "NOT" gates) are implemented. Whenever a glitch attack occurs, there will not be enough time to go through all those logic elements before the clock signal edge, which makes the outcome of a calculation necessarily wrong. A wrong calculation result thereby indicates a timing constraint violation and consequently a glitch attack. Checking whether the calculations match the expected result or not is, for example, performed by a matching circuit attached to a canary circuit 2 (not shown) or it is performed by the canary circuits 2 themselves.

Figure 7:
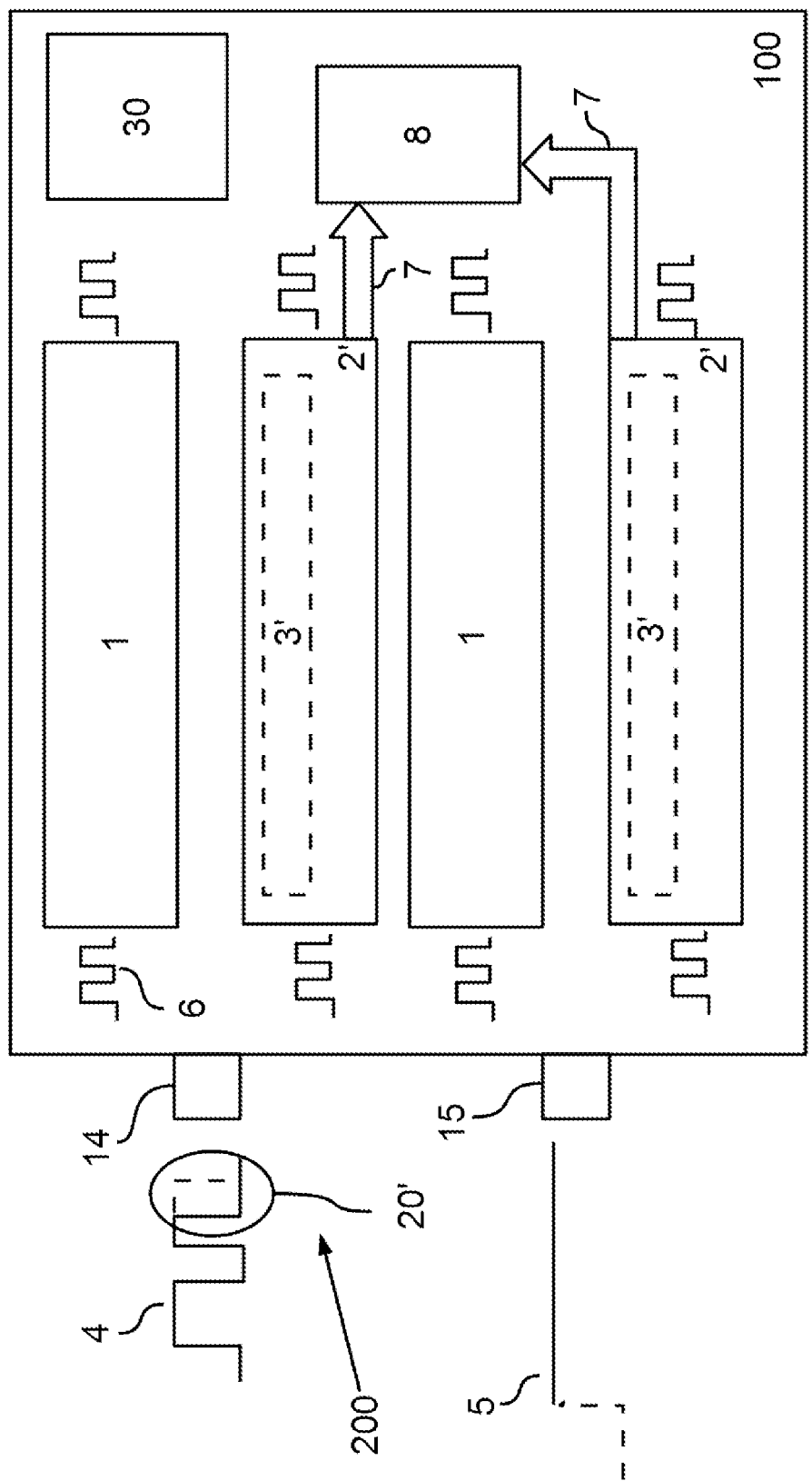
FIG. 7 shows a schematic block diagram of an integrated circuit, equipped with anti-clock-glitch canary circuits, which suffers a glitch attack on the integrated circuit's clock signal input.

FIG. 7 provides a schematic view on the integrated circuit of FIG. 2, with the difference that a glitch 20' is introduced only into the clock signal 4, when the integrated circuit 100 suffers the glitch attack 200. Furthermore, the integrated circuit 100' is equipped with an anti-clock glitch canary circuit 2', providing a signal path 3' that is chosen such that the timing constraint of said canary circuit 2' is violated as a consequence of the glitch 20' present in the clock signal. The exemplary signal path 3' thereby provides a propagation time with enough time buffer to the timing constraint of the canary circuit 2' to be not yet violated by natural signal deviations or local chip variations but to be certainly violated by a clock-edge shift to an earlier time in the form of the voltage glitch 20'. Such a violation corresponds to the detection of a glitch attack on the clock input 14 of the integrated circuit 100.

Figure 8:
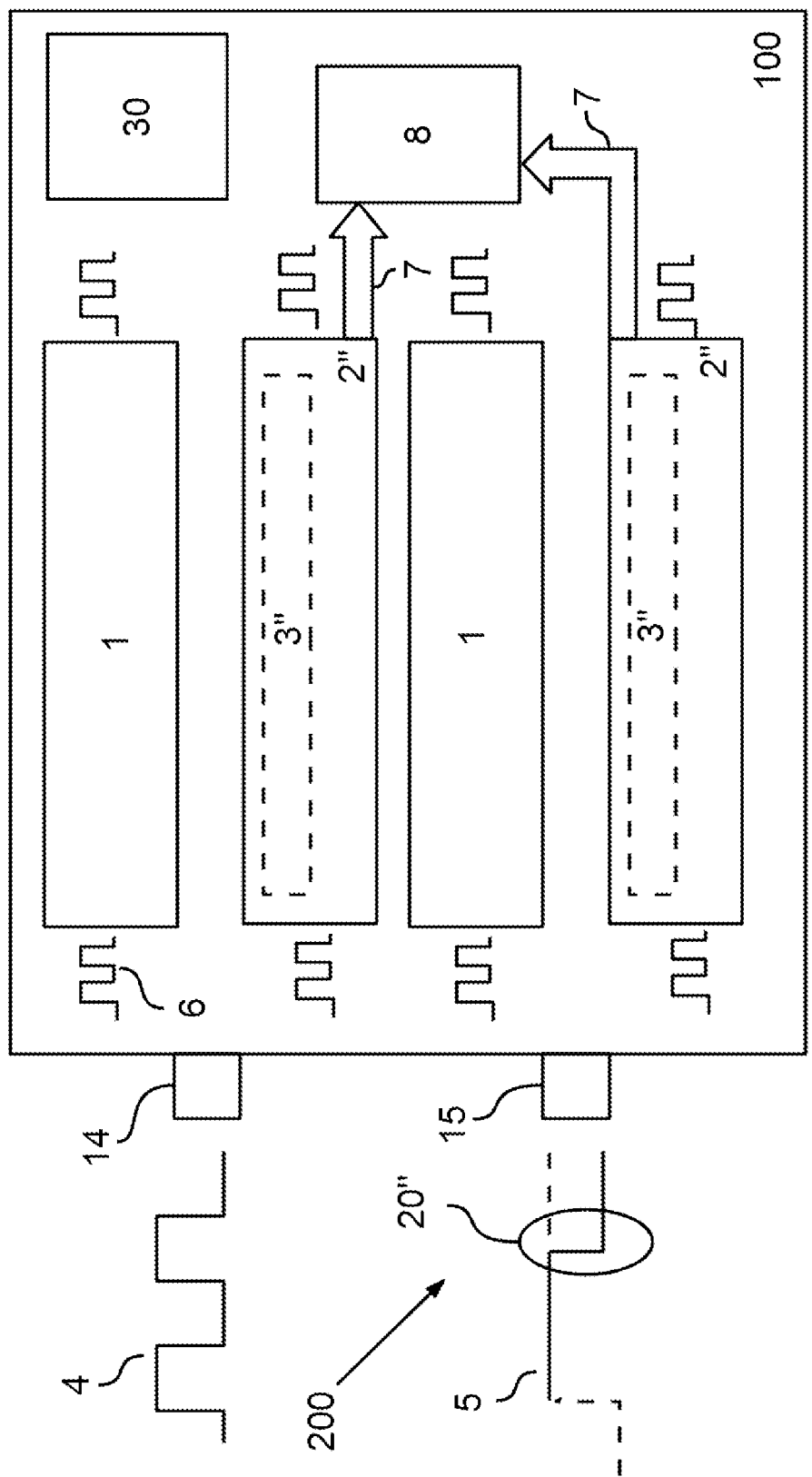
FIG. 8 shows a schematic block diagram of an integrated circuit, equipped with anti-voltage-glitch canary circuits, which suffers a glitch attack on the integrated circuit's voltage signal input.

FIG. 8 provides a schematic view on the integrated circuit of FIG. 2, with the difference that a glitch 20" is introduced only into the voltage signal 5 in the course of a glitch attack 200. Furthermore, the integrated circuit 100 is equipped with an anti voltage-glitch canary circuit 2", providing a signal path 3" that is chosen such that the timing constraint of said canary circuit 2" is violated as a consequence of the glitch 20" present in the voltage signal. The exemplary signal path 3" thereby provides a propagation time with enough time buffer to the timing constraint of the canary circuit 2" to be not yet violated by natural signal deviations or local chip variations but to be certainly violated by a voltage drop in the form of the voltage glitch 20". Such a violation corresponds to the detection of a glitch attack on the voltage input 15 of the integrated circuit 100.

Figure 9:
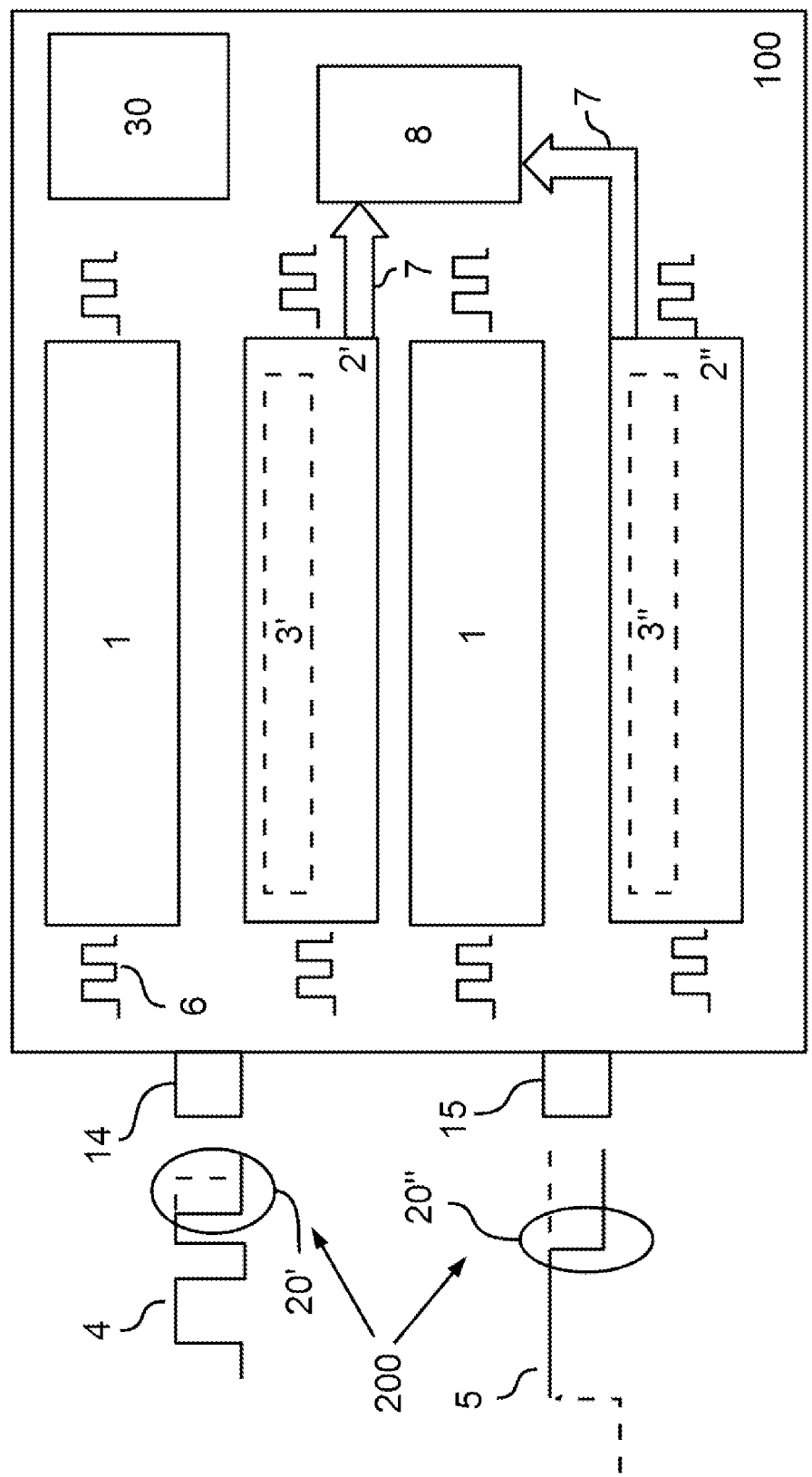
FIG. 9 shows a schematic block diagram of an integrated circuit, equipped with anti-voltage-glitch and anti-clock-glitch canary circuits, which suffers a glitch attack on the integrated circuit's power/voltage signal and clock signal inputs.

FIG. 9 provides a schematic block diagram of an integrated circuit 100 equipped with both anti voltage-glitch canary circuits 3" and anti clock-glitch canary circuits 3' to address a voltage glitch 20" as well as a clock glitch 20'. The detection of a voltage or clock glitch by the canary circuits 3',3" triggers the actions as described in conjunction with FIGS. 14, 15 and 16.

Figure 10:
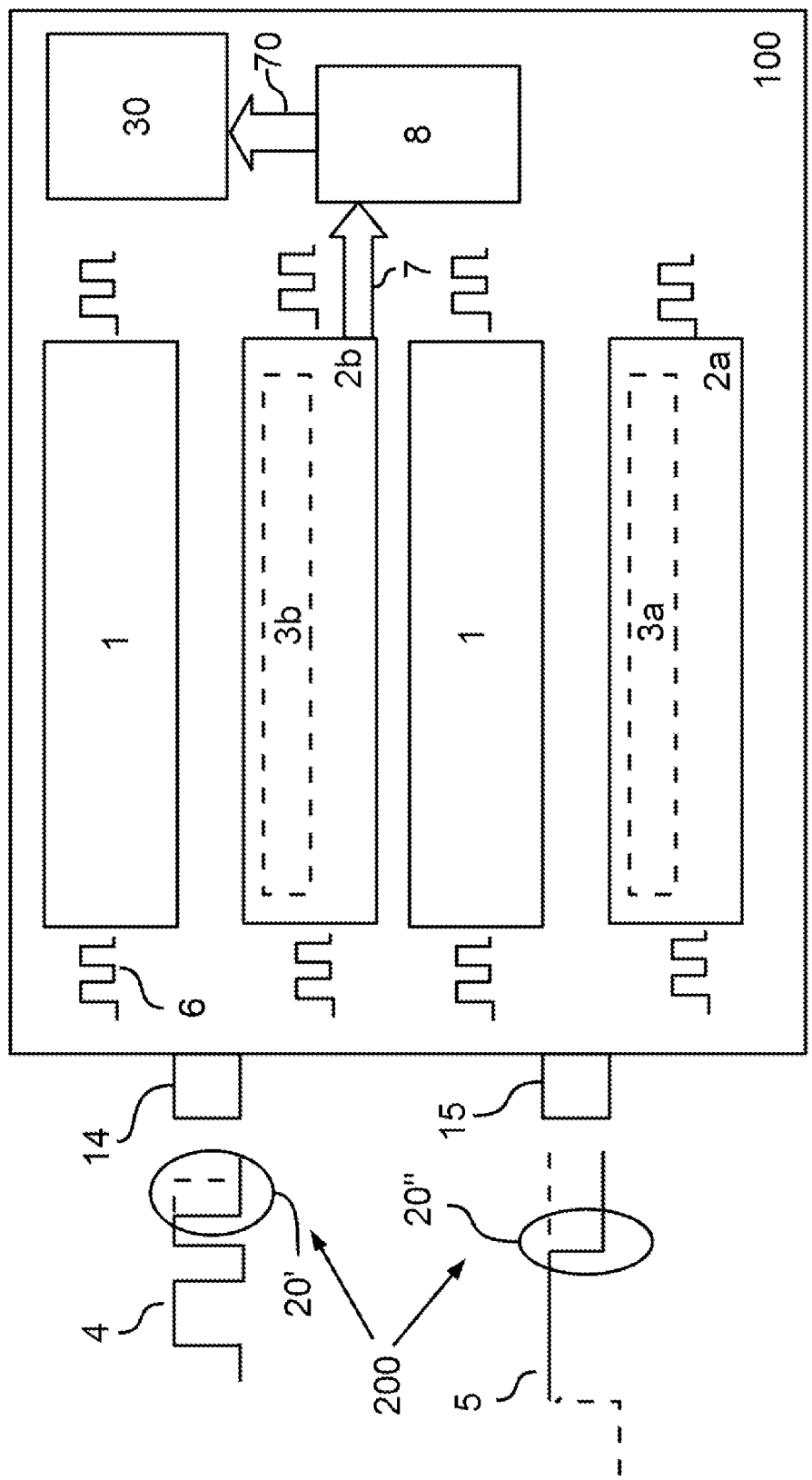
FIG. 10 shows a schematic block diagram of an integrated circuit equipped with strict and a relaxed canary circuits, with the strict canary circuit responding to a glitch attack

FIG. 10 is a schematic block diagram of an integrated circuit 100 equipped with a strict canary circuit 2b and a relaxed canary circuit 2a. In the scenario shown in FIG. 10 only the strict canary circuit 2b suffers a timing constraint violation but this is not the case for the relaxed canary circuit 2a, the timing constraint of which is aligned with the timing constraint of the functional circuit 1. This is interpreted as a glitch attack that has occurred but has not tempered with the functional circuit 1 (or the main logic 30 if identical) yet.

Figure 15:
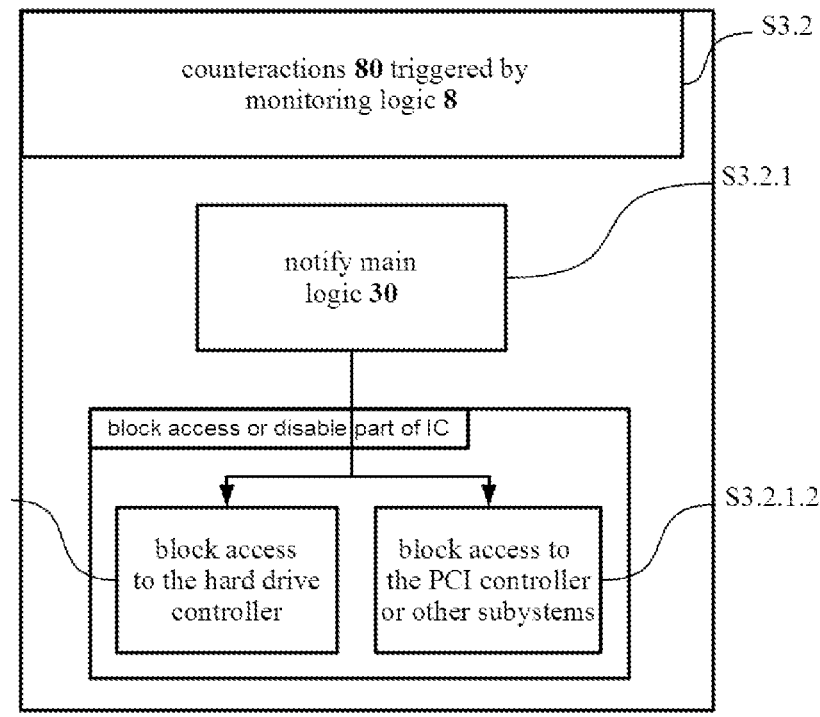
FIG. 15 provides a flow chart of exemplary counteractions 80 triggered by the monitoring logic 8.

Hence, upon receiving the intrusion detection signal 7, the monitoring logic 8 causes a counteraction 70 to be performed by the main logic 30, such as those illustrated in FIG. 15.

Figure 16:
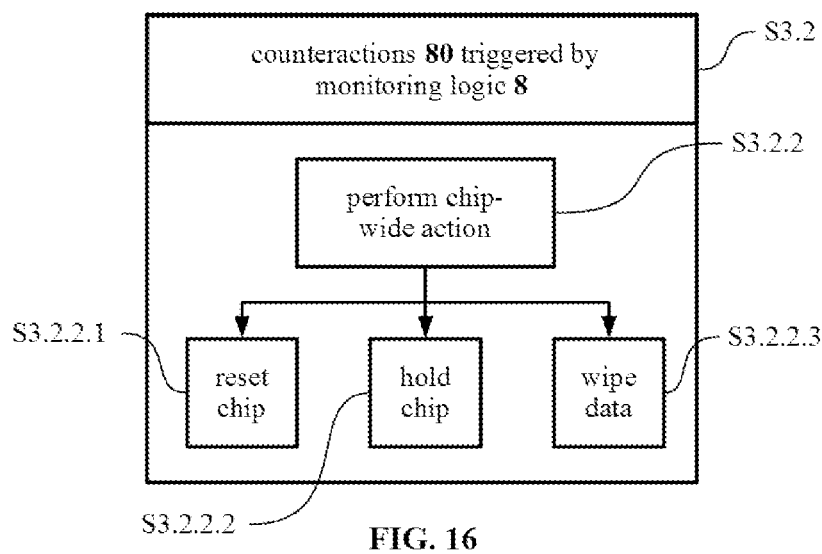
FIG. 16 provides a flow chart of exemplary counteractions 80 triggered by the monitoring logic 8 different to those counteractions illustrated in FIG. 15.

FIG. 11 shows the integrated circuit of FIG. 12 in a different scenario. In this scenario the timing constraints both of the relaxed canary circuit 2a and the strict canary circuit 2b are violated. This is interpreted as a glitch attack being present which has most likely already tempered with the functional circuit 1 (which could also be identical to the main logic 30). In this scenario, counteractions are performed by the monitoring logic 8 itself. Examples for these counteractions are illustrated in FIG. 16.

FIG. 12 provides a schematic block diagram of an integrated circuit 100 with canary circuits 2 located close to a sensitive place of said integrated circuit 100.

In the integrated circuit 100 in which a canary circuit 2, providing a signal path 3 is located adjacent to the input of a cryptographic engine 50. The effects and reasons for such a placement of the cryptographic engine have been already discussed above.

Figure 13:
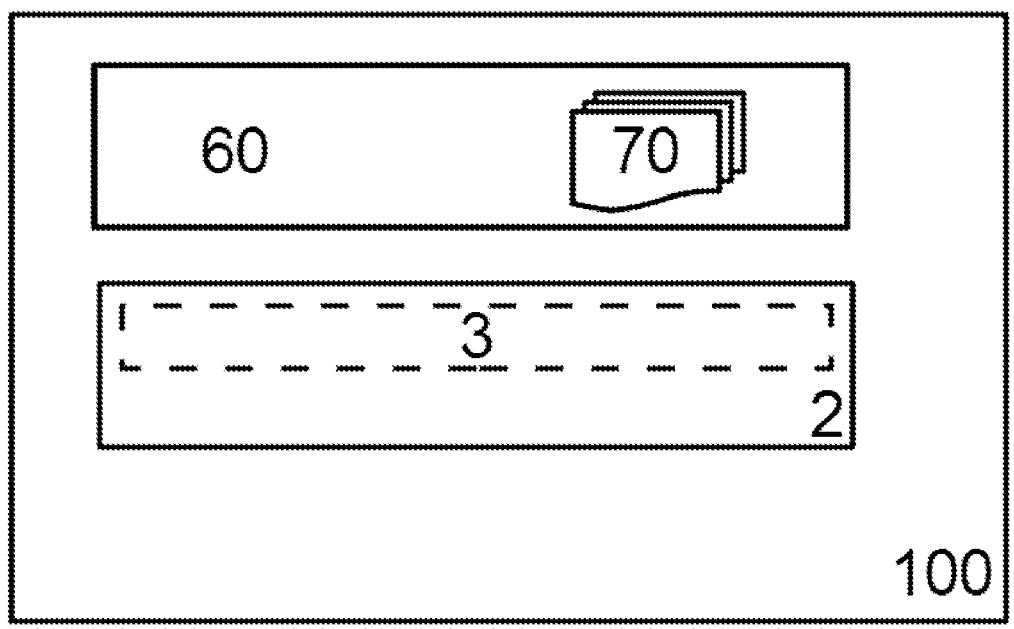
FIG. 13 shows an exemplary integrated circuit with a canary circuit placed adjacent to a storage medium on which a firmware signature is stored.

FIG. 13 also provides a schematic block diagram of an integrated circuit 100 with canary circuits located close to a sensitive place of the integrated circuit 100.

In this example, the canary circuit 2, providing path 3, is located adjacent to a memory 60 on which a firmware signature is stored. The effect and the reason for this placement has also already been discussed above.

Figure 14:
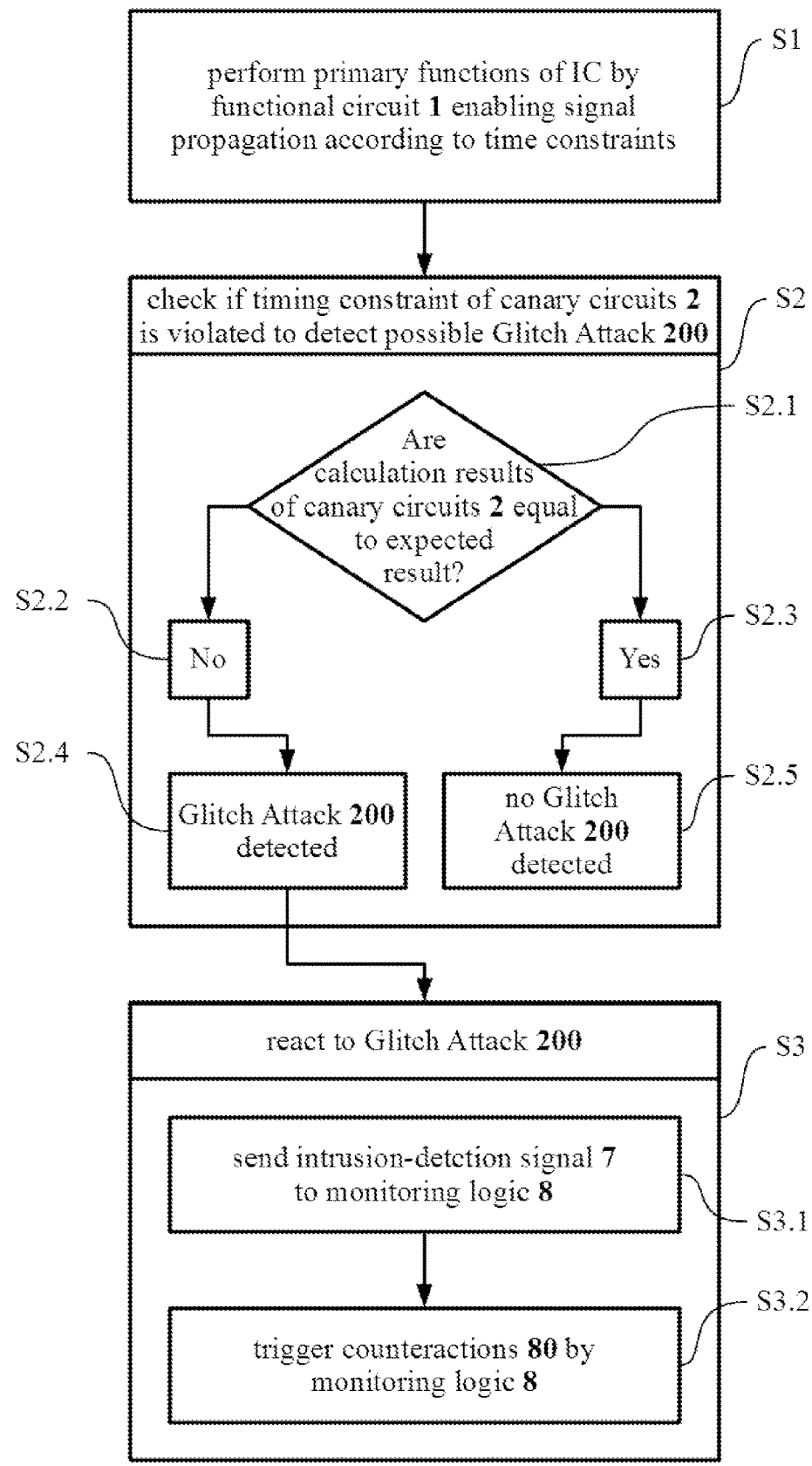
FIG. 14 provides a flow chart of an exemplary method of handling a glitch attack on an integrated circuit.

FIG. 14 provides a flowchart of a method of handling a glitch attack on an integrated circuit. At reference numeral S1 primary functions of an integrated circuit 100, such as encryption, reading out data etc., are performed. In this activity, signals propagate through at least one functional circuit 1.

It is continuously checked at reference numeral S2 if the timing constraints of the canary circuits is violated to detect possible glitch attacks 20. Checking if the timing constraint of the canary circuits is violated comprises checking whether calculation results obtained by the canary circuits 2 are equal to expected results. These calculation results are obtained, for example, by standard logic gates as illustrated by FIG. 6.

When it is found out that the calculation results do not match the expected results at reference numeral S2.2, this is counted as a glitch attack 20 detected at reference numeral S2.4. If, however, the calculation results do match the expected result at reference numeral S2.3, this is counted as no glitch attack being detected at reference numeral S2.5.

In response to a glitch attack being detected at reference numeral S2.4 it is reacted to the glitch attack at reference numeral 20. Reacting to the glitch attack comprises sending an intrusion-detection signal 7 to the monitoring logic 8 at reference numeral S3.1.

FIG. 15 provides a flowchart of counteractions against a glitch attack 200. Counteractions 80 are triggered by the monitoring logic 8.

The counteractions 80 triggered by the monitoring logic 8 at reference numeral S3.2 comprise notifying the main logic 30. The main logic's 30 actions comprise at least one of (i) block access to the hard drive controller at reference numeral S3.2.1.1 and (ii) block access to the PCI controller or other subsystems at reference numeral S3.2.1.2 or other actions the block access to the integrated circuit or disable a part of the integrated circuit.

FIG. 13 provides a flow chart of different counteractions 80 triggered by the monitoring logic 8 at reference numeral S3.2.

Those counteractions are chip wide actions at reference numeral S3.2.2. Those chip-wide actions comprise at least one of (i) reset chip at reference numeral S3.2.2.1, (ii) hold chip at reference numeral S3.2.2.2 and (iii) a data wipe of the chip at reference numeral S3.2.2.3.

It is to be understood that the examples disclosed herein are provided for illustrative purposes and are not to be construed as limiting the scope of the present disclosure.

The invention claimed is:

1. An integrated circuit comprising:
 a functional circuit to perform primary functions of the integrated circuit, wherein electrical signals propagate through the functional circuit with a first propagation delay that is within a timing constraint of the integrated circuit based on a clock signal of the integrated circuit;
 a strict canary circuit through which electrical signals propagate with a second propagation delay approximating the timing constraint of the integrated circuit, where the strict canary circuit detects glitches in the clock that violate the timing constraint;
 a relaxed canary circuit through which electrical signals propagate with a third propagation delay between the first propagation delay and the second propagation delay, where the relaxed canary circuit detects glitches in the clock signal approximating the first propagation delay of the functional circuit; and
 monitoring logic to:
  identify a first glitch in the clock signal as unlikely to have compromised the functional circuit based on the glitch being detected by the strict canary circuit and undetected by the relaxed canary circuit, and
  identify a second glitch in the clock signal as likely to have compromised the functional circuit based on the glitch being detected by the strict canary circuit and the relaxed canary circuit.

2. The integrated circuit of claim 1, wherein the monitoring logic is to send an intrusion-detection signal in response to identification of the second glitch to initiate a counteraction against a glitch attack.

3. The integrated circuit of claim 1, wherein a plurality of canary circuits are distributed over the integrated circuit.

4. The integrated circuit of claim 1, wherein each of the strict canary circuit and the relaxed canary circuit is implemented in a block of the integrated circuit which is separate from the functional circuit.

5. The integrated circuit of claim 1, wherein each of the strict canary circuit and the relaxed canary circuit comprises standard logic gates and is to perform calculation operations, wherein a violation of the timing constraint is deemed to have occurred in response to a result of the calculation operations not matching an expected result of the calculation operations.

6. The integrated circuit of claim 1, wherein each of the strict canary circuit and the relaxed canary circuit comprises standard logic gates, including a succession of inverters, to perform calculation operations, wherein a violation of a timing constraint is deemed to have occurred in response to a result of the calculation operations not matching an expected result of the calculation operations.

7. The integrated circuit of claim 1, wherein the glitches in the clock signal are caused by a voltage glitch.

8. The integrated circuit of claim 1, wherein the integrated circuit comprises a storage medium on which a firmware-signature is stored and wherein each of the strict canary circuit and the relaxed canary circuit is placed adjacent to circuits for accessing said storage medium on which the firmware signature is stored.

9. The integrated circuit of claim 1, wherein the integrated circuit comprises a cryptographic engine and wherein each of the strict canary circuit and the relaxed canary circuit is placed in the integrated circuit adjacent to at least one of the input and the output of said cryptographic engine.

10. A method of handling a glitch attack on an integrated circuit, the method comprising:
    performing primary functions of the integrated circuit by a functional circuit, wherein the functional circuit enables electric signals to propagate through the functional circuit with a first propagation delay that is within a timing constraint of the integrated circuit; and
    detecting a glitch attack based on identification of a glitch in a clock signal identified by both a strict canary circuit and a relaxed canary circuit,
    wherein the strict canary circuit propagates electrical signals with a second propagation delay approximating the timing constraint of the integrated circuit, and
    wherein the relaxed canary circuit propagates electrical signals with a third propagation delay between the first propagation delay and the second propagation delay.

11. The method of claim 10, further comprising:
    sending an intrusion-detection signal to initiate a counteraction in response to the glitch attack.

12. The method of claim 10, wherein each of the strict canary circuit and the relaxed canary circuit comprises standard logic gates, including a succession of inverters, to perform calculation operations.

13. The method of claim 10, wherein detecting the glitch attack comprises detecting a voltage glitch attack.

14. The method of claim 10, wherein the integrated circuit comprises a storage medium on which a firmware-signature is stored and wherein each of the strict canary circuit and the relaxed canary circuit is placed adjacent to circuits for accessing said storage medium on which the firmware signature is stored.

15. The method of claim 10, wherein the integrated circuit comprises a cryptographic engine and wherein each of the strict canary circuit and the relaxed canary circuit is placed in the integrated circuit adjacent to at least one of the input and the output of said cryptographic engine.

* * * * *